April 21, 1953
C. BAILIFF
2,635,888
ADJUSTABLE WHEEL ASSEMBLY FOR EARTH HANDLING AND LEVELING APPARATUS
Filed Aug. 18, 1947
4 Sheets-Sheet 1
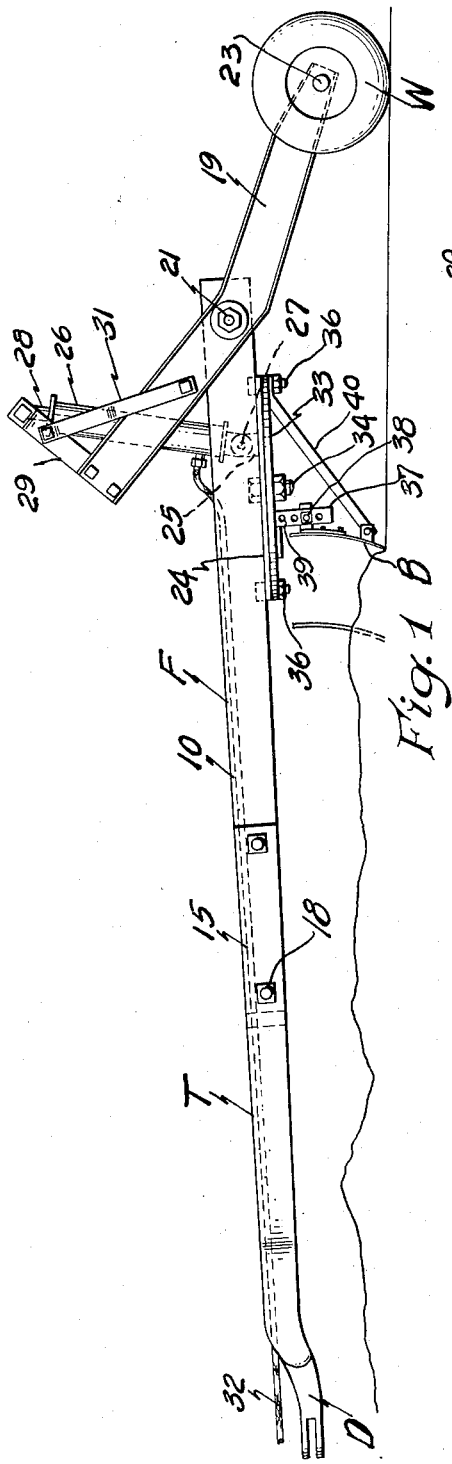
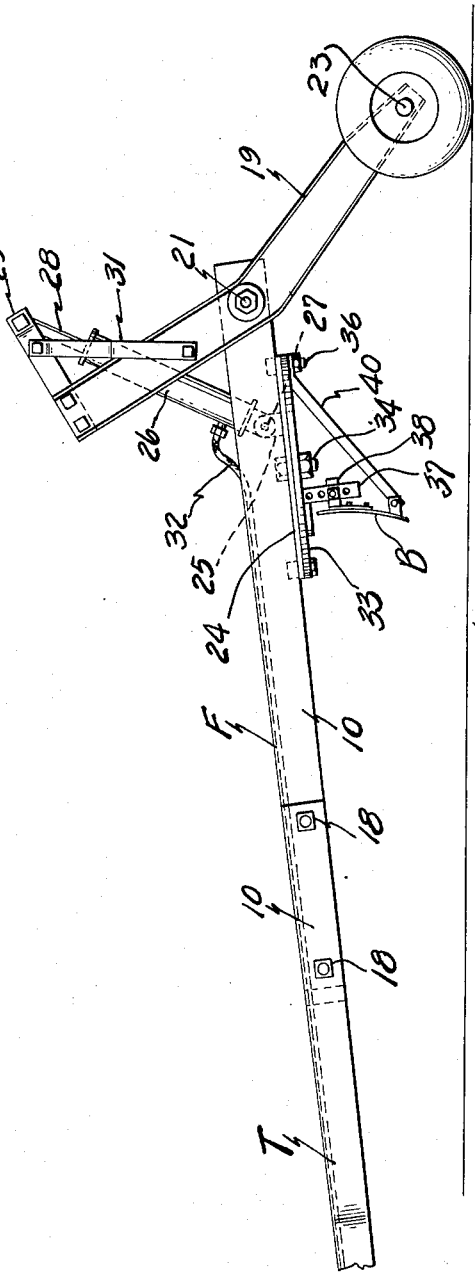
INVENTOR.
Charles Bailiff
BY Frank C. Fearman
ATTORNEY

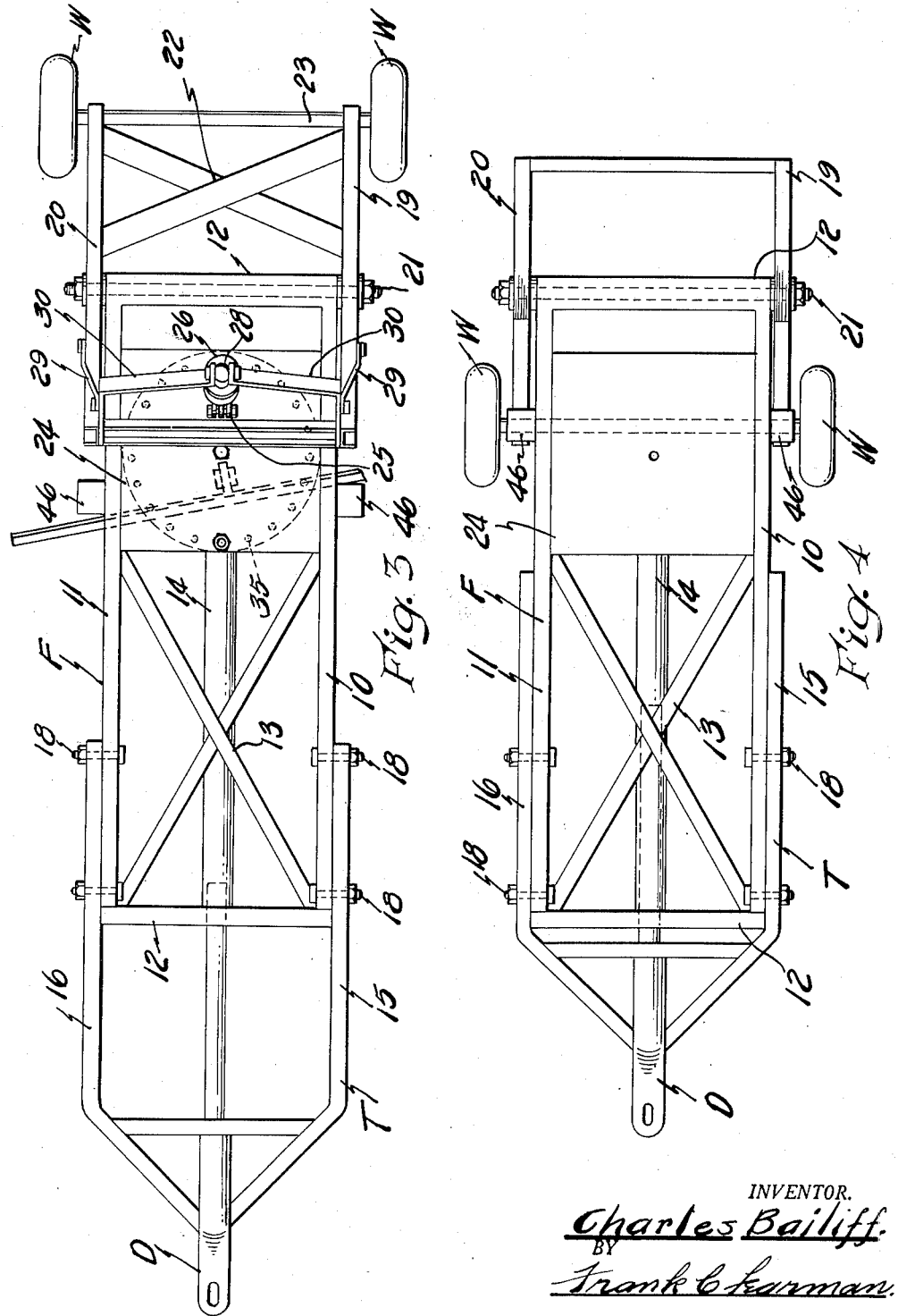

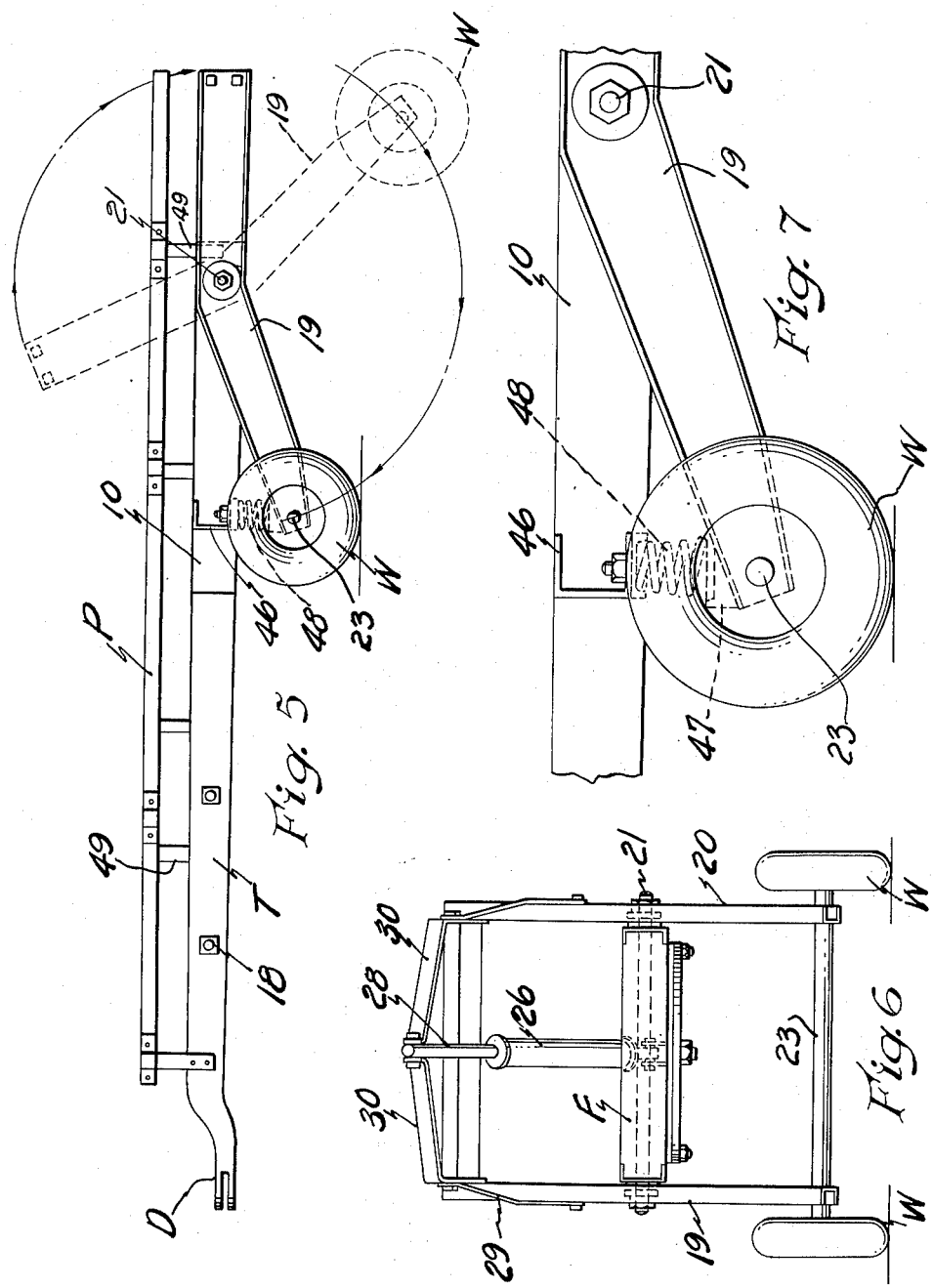

April 21, 1953
C. BAILIFF
2,635,888
ADJUSTABLE WHEEL ASSEMBLY FOR EARTH
HANDLING AND LEVELING APPARATUS
Filed Aug. 18, 1947
4 Sheets-Sheet 4
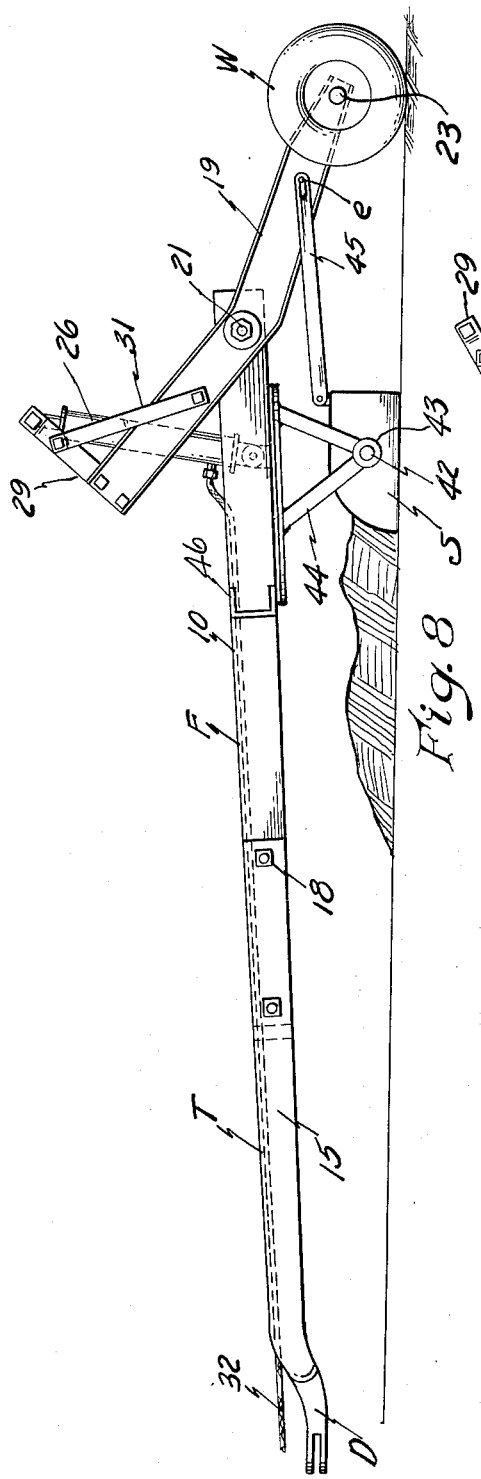
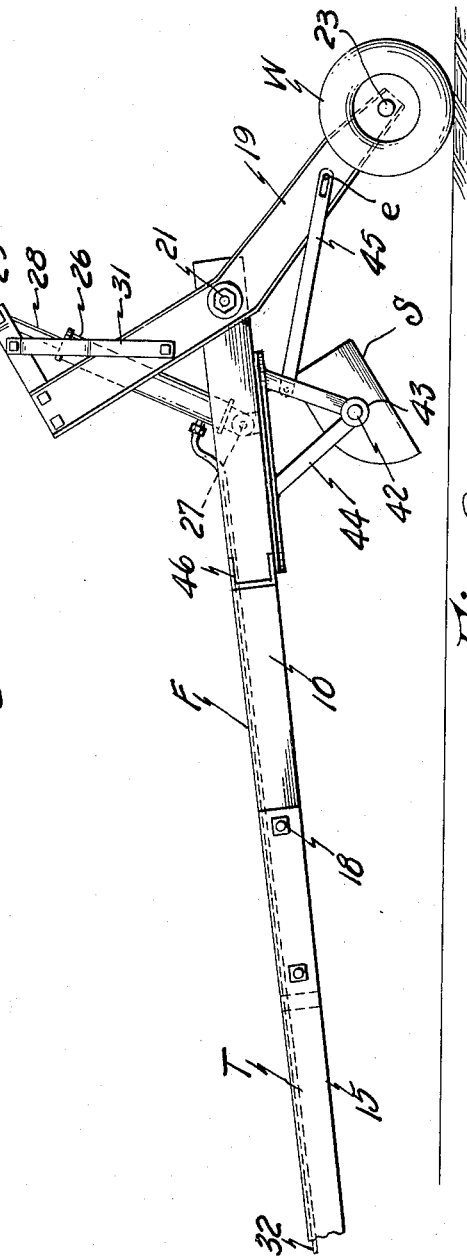
INVENTOR.
Charles Bailiff.
BY Frank C. Leaman.
ATTORNEY Patented Apr. 21, 1953

2,635,888

UNITED STATES PATENT OFFICE 2,635,888

ADJUSTABLE WHEEL ASSEMBLY FOR EARTH HANDLING AND LEVELING APPARATUS

Charles Bailiff, Omer, Mich.

Application August 18, 1947, Serial No. 769,249

1 Claim. (Cl. 280—30)

This invention relates to leveling, grading, and hauling apparatus adapted to be drawn by a tractor or prime mover and equipped with means for easily and quickly controlling and adjusting the leveling, grading, and earth moving mechanism.

One of the prime objects of the invention is to design an earth leveling and moving apparatus by means of which large areas and/or fields can be easily, quickly, and evenly leveled, holes filled, and scoops of earth moved from one place to another, with no manual effort other than the manipulation of the valve controlling the hydraulic means.

Another object is to design an apparatus which can be readily converted from an earth moving and leveling device to a load transporting apparatus, which apparatus can be readily drawn by a truck, tractor or other power vehicle.

Still a further object is to design a convertible apparatus, the frame of which can be readily telescoped, and the wheels swung in under the frame to form a readily maneuverable trailer, which can be operated over any roadway, and which is adaptable for transporting produce, tools or other articles of any nature.

A further object still is to provide a simple, practical, and relatively inexpensive convertible apparatus which can be easily manufactured and assembled, and which can be utilized for general utility purposes.

With the above and other objects in view, the present invention consists in the combination and arrangement of parts, hereinafter more fully described, illustrated in the accompanying drawings, and more particularly pointed out in the appended claim, it being understood that changes may be made in the form, size, proportion, and minor details of construction, without departing from the spirit, or sacrificing any of the advantages of the invention.

In the drawings:

Fig. 1 is a side-elevational view of my convertible apparatus showing a scraper blade in position thereon for grading and leveling.

Fig. 2 is a similar view showing the blade in raised position.

Fig. 3 is a plan view of the apparatus shown in Fig. 1.

Fig. 4 is also a plan view showing the frame shortened with the wheels swung beneath the frame, the pneumatic cylinder etc. being omitted.

Fig. 5 is a side-elevational view showing the apparatus converted to serve as a trailer, with the pneumatic means omitted, the broken lines and arrows showing the path of travel of the wheels as they are swung to position.

Fig. 6 is a rear-elevational view of the apparatus shown in Fig. 2.

Fig. 7 is an enlarged, fragmentary, side-elevational view showing the manner of springing the frame.

Fig. 8 is a view similar to Fig. 1 showing a scoop in position for loading.

Fig. 9 is a similar view showing the scoop raised to dumping position.

Referring now more particularly to the drawings in which I have shown the preferred embodiment of my invention. The letter F indicates a horizontally disposed main frame comprising spaced-apart side members 10 and 11 respectively connected by means of cross bars 12 and diagonally disposed brace members 13, and a centrally disposed tubular section 14 is provided at the front end of said frame.

A telescopic frame section T is connected to and forms an extension of the front end of the main frame F, said frame including longitudinally disposed side members 15 and 16, the front ends of which converge and are connected to a drawbar D, the opposite end being slidably and telescopically inserted in the horizontally disposed member 14, and bolts 18 are provided to secure the frames in set position.

A trailing wheel frame is secured to the rear end of the main frame, and comprises a pair of upright members 19 and 20, pivotally connected to the rear end of the main frame F by means of the rod 21.

Diagonally disposed braces 22 span the uprights 19 and 20, and ground engaging wheels W are mounted on an axle 23 provided on the lower ends of the wheel frame in the usual manner.

A preferably flat plate 24 spans the main frame F as shown, and a yoke 25 is mounted thereon, a hydraulic cylinder 26 being pivotally connected to the yoke by means of the pin 27, and a piston (not shown) is slidably mounted in said cylinder, and a piston rod 28 is secured thereto. Laterally projecting braces 29 are connected to the upper ends of the uprights 19 and 20, straps 30 connect the braces 29 with the upper ends of the piston rod 28, and diagonally disposed braces 31 serve to reinforce the braces 29.

A flexible hydraulic line 32 is connected to the cylinder 26, said line leading to the prime mover (not shown) so that the pressure medium can be controlled from said prime mover as usual.

The hydraulic medium serves to raise and/or lower the piston (not shown) in the cylinder, so that the wheel frame is swung about the pivot point 21 to raise or lower the end of the main frame accordingly.

The plate 24 can be secured to the main frame in any desired manner, and a circular disc or plate 33 is connected thereto by means of the center bolt 34, a plurality of bolt openings 35 being provided adjacent the outer rim of the disc, and bolts 36 serve to secure the disc to the plate.

A depending bracket 37 is secured to the lower face of the disc member 33, and a blade B is secured thereto by means of bolts 38 or the like, opening 39 being provided in the bracket so that the blade can be vertically adjusted and set at desired depth, and a rearwardly projecting brace 40 is connected to the blade and disc respectively to reinforce said blade as is customary in structures of this nature, and it will be obvious that the blade can be adjusted to any desired angle or depth by adjusting the disc 33 on the plate 24 and the blade B with relation to the lower face of said disc.

The drawbar D can be connected to any prime mover (not shown), and the hydraulic means is operable to raise and/or lower the rear end of the main frame by swinging the wheel frame about the pivot point 21.

In Figs. 8 and 9 of the drawings, I have shown the apparatus equipped with a scoop S, said scoop being provided with side trunnions 42 which are journaled in bearings 43 provided on the brackets 44, which brackets are secured to the plate 24, braces 45 being connected to said scoop and to the wheel frame, the rear end of the brace being slotted as at e to compensate for the relative movement between the bracket 44 and the wheel frame, and when the rear end of the main frame is lowered, the scoop is loaded as the device is drawn forwardly; then when the wheel frame is swung upright, the scoop load can be discharged and/or spread as the apparatus is drawn, the tilting regulating the spread.

In Figs. 5 and 7 of the drawings, I have shown the apparatus converted to serve as a trailer, the hydraulic cylinder and scraper being omitted and the wheel frame being swung from position indicated in broken lines to solid line position and as indicated by the arrows.

Brackets 46 are provided on the sides of the main frame members 10 and 11, and pads 47 are provided on the lower ends of the wheel frame, coil springs 48 being interposed between the brackets and pads so that the frame is properly sprung.

The main frame is preferably shortened, as shown in Fig. 5, when it is used as a trailer, and a platform P is secured on the main frame by means of straps 49 or the like; the drawbar being connected to any power vehicle and the trailer is then useable in the same manner as any conventional trailer.

While in the instant application I have shown a scraper and a scoop in connection with the device, it will be readily understood that a multiplicity of tools of various kinds such as hooks for removing sunken logs, stones, obstacles, or any agricultural attachment, can be attached.

From the foregoing description, it will be obvious that I have perfected a very simple, practical, and economical apparatus which can be converted to a great number of uses in a very short time, and in a very simple manner.

What I claim is:

A convertible, earth-handling apparatus and carrier comprising a rigid main frame for detachably mounting a depending earth-handling implement, said main frame being releasably connected at its front end to a draft means, a rear end supporting wheeled frame pivotally mounted intermediate its length on the rear end of said main frame, a plate spanning the under portion of said main frame, means thereon for pivotally and detachably mounting a hydraulic cylinder adapted to be detachably connected to the upper end of said supporting frame when said supporting frame is obtusely disposed with relation to and trailing said main frame, and to pivot said supporting frame when actuated to vertically adjust said main frame with relation to the ground, the upper portion of said wheeled supporting frame being turned outwardly at an obtuse angle with relation to the remaining portion of said wheeled frame to form a continuing, horizontal carrier frame level with said rigid frame when said hydraulic cylinder and said earth-handling implement are detached and said supporting frame is swung in under said rigid frame.

CHARLES BAILIFF.

References Cited in the file of this patent

UNITED STATES PATENTS

| Number | Name | Date |
|---|---|---|
| 819,302 | Munsing | May 1, 1906 |
| 927,887 | Sickler | July 13, 1909 |
| 1,106,104 | Marx | Aug. 4, 1914 |
| 1,735,404 | Masury | Nov. 12, 1929 |
| 1,759,982 | Hauser | May 27, 1930 |
| 1,909,854 | Dean | May 16, 1933 |
| 1,982,219 | McAlister | Nov. 27, 1934 |
| 2,004,846 | Allison et al. | June 11, 1935 |
| 2,059,205 | Buffington | Nov. 3, 1936 |
| 2,174,063 | Richards | Sept. 26, 1939 |
| 2,208,526 | Gurries | July 16, 1940 |
| 2,218,881 | Herlach | Oct. 22, 1940 |
| 2,351,830 | Mitchell et al. | June 30, 1944 |
| 2,452,267 | Schramm | Oct. 26, 1948 |
| 2,522,357 | Framhein | Sept. 12, 1950 |